United States Patent [19]
Hawkins

[11] Patent Number: 4,718,297
[45] Date of Patent: Jan. 12, 1988

[54] INFINITE RATIO TRANSMISSION APPARATUS

[76] Inventor: Dale A. Hawkins, 8177 Pescadero Rd., Loma Mar, Calif. 94021

[21] Appl. No.: 707,614

[22] Filed: Mar. 4, 1985

[51] Int. Cl.$^4$ .............................................. F16H 37/08
[52] U.S. Cl. ...................................... 74/682; 74/427; 74/705; 74/714
[58] Field of Search ................. 74/681, 682, 689, 705, 74/714, 724, 427

[56] References Cited

U.S. PATENT DOCUMENTS

| | | | |
|---|---|---|---|
| 2,995,049 | 8/1961 | Bolliger | 74/681 X |
| 3,007,346 | 11/1961 | Demuth | 74/427 |
| 3,645,152 | 2/1972 | Olcer | 74/682 |
| 3,770,879 | 11/1973 | Watson | 74/682 |
| 3,897,697 | 8/1975 | Chambers et al. | 74/682 |
| 4,481,844 | 11/1984 | Ironside et al. | 74/866 |

FOREIGN PATENT DOCUMENTS

483343  4/1938  United Kingdom ................. 74/689

Primary Examiner—Leslie Braun
Assistant Examiner—Dwight G. Diehl
Attorney, Agent, or Firm—Townsend and Townsend

[57] ABSTRACT

A transmission having an input differential and an output differential; each differential having a pair of coaxial shafts rotatable independently of each other and a rotatable member coupled to the shafts and rotatable relative thereto. Structure is provided to couple each shaft of one differential with a respective shaft of the other differential. The rotatable member of the first differential is adapted to be coupled to a power source and rotated thereby so that the rotation of such rotatable member is transferred to the rotatable member of the second differential through said structure. A speed control device can be coupled to one of the shafts of the first differential to control the speed of the shaft and thereby permit infinite variations between a zero speed (neutral) of the rotatable member of the second differential and a maximum speed.

2 Claims, 21 Drawing Figures

INFINITE RATIO TRANSMISSION APPARATUS

This invention relates to improvements in mechanical transmissions suitable for many different uses, including use with a vehicle and, more particularly, an improved infinite ratio transmission apparatus which may be controlled by a microprocessor.

BACKGROUND OF THE INVENTION

Transmissions of different types have been developed over the years to provide greater control of mechanical loads, such as the driving wheels of power vehicles. For the most part, such transmissions, because of their complexity, have not been proven to be fully efficient in providing a practical means to transfer the power of a power source to a load for operating the load in both forward and reverse directions. In all transmissions, it is desirable to enable a vehicle, for instance, to accelerate to a maximum through a wide speed range, while the engine of the vehcle operates within its most effective speed range. It is also desirable to have no limitations as to power input applied to the transmission and power output obtained from a transmission. Moreover, it is greatly to be preferred that, in a transmission, there be no engagement or disengagement of gears.

It is also desirable in the design of transmissions to use component parts which have no frictional wearing surfaces, such as belts, bands and the like. Also, reduction in air pollution is a desired aim in the design of transmissions. It is also especially preferable to provide for a transmission design a power source of constant output speed, such as electric motors, turbines and the like. If a transmission can be controlled by a microprocessor, greater control of the transmission can be achieved than has heretofore been capable.

Since no comercially available transmission has the desirable characteristics mentioned above, a need exists for improvements in mechanical transmissions of the type for operating vehicles and other loads in forward and reverse directions. The present invention satisfies this need.

SUMMARY OF THE INVENTION

The present invention is directed to an improved transmission apparatus which is simple and rugged in construction, is of the infinite ratio type, and can be easily controlled by a microprocessor. The apparatus of the present invention is especially suitable for use with vehicles which require forward, reverse or neutral operating conditions with the use of any one of a number of different power sources.

The benefits derived from the use of the apparatus of the present invention is increased efficiency, greater fuel savings, smoother operation, greater available power, lower maintenance costs and simplicity of construction and operation. The apparatus of the present invention has no power limitations, does not require a torque converter, does not need to use clutches, and has no excessively frictional wearing surfaces. An important feature of the invention is there is no engagement and disengagement of gears. As a result, the apparatus provides for changes in operating speeds by way of smooth accelerations and decelerations so as to provide increased efficiency in stop and go situations. There is no pollution associated with the operation of the apparatus of the present invention and the apparatus is especially suitable for use with power sources of constant drive speed, such as electric motors, turbines or the like. A speed ratio can be readily selected from full forward, through neutral to full reverse, all to the end that the apparatus of the present invention can be operated without special skills on the part of the user of the apparatus to thereby provide an improved infinite ratio transmission apparatus which can be readily adapted for a wide variety of applications.

The primary object of the present invention is to provide an improved transmission apparatus which is of the infinite ratio type and which can be easily controlled, such as by a microprocessor, from a 1:1 speed ratio in a forward sense, through neutral or zero speed, and to a 1:1 speed ratio in a reverse sense yet the apparatus is simple and rugged in construction, is made of a relatively few number of parts and is inexpensive to produce and maintain.

Other objects of this invention will become apparent as the following specification progresses, reference being had to the accompanying drawings for an illustration of the invention.

A first embodiment of the transmission apparatus of the present invention is broadly denoted by the numeral 10 and is shown in FIGS. 1, 1a, 1b, 2 and 3. It includes a support 12 which, for purposes of illustration, includes four walls 14, 16, 18 and 20 mounted on a base plate 21. In practice, base plate 21 will not be provided if the transmission apparatus is used on a vehicle, for instance. However, walls 14, 16, 18 and 20 or other similar means will typically be used in some manner, such as on the frame of a vehicle, for mounting of component parts as hereinafter described.

A first or input differential 22 has means coupling it to a first shaft 24 journaled by bearings in walls 18 and 20. Differential 22 is also coupled to a second shaft 26 journaled by bearings in walls 14 and 16. Differential 22 is conventional in construction and, for purposes of illustration, is of the type shown in FIGS. 1a and 1b. To this end, differential 22 includes a ring gear 28 coupled by a number of circumferentially spaced spur gears 30 to a pair of side members 32 and 34. Spur gears 30 are in mesh with the teeth of a ring gear 35 on the inner face of each of members 32 and 34, and spur gears 30 rotate about axes 36 radial to the central axis of ring gear 28. For purposes of illustration, member 32 is coupled to shaft 24 and member 34 is coupled to shaft 26. Members 32 and 34 are rotatable independently of each other; thus, they can rotate together and in the same direction, one of the members can be stationary as the other member rotates, or the members can rotate in the opposite direction with respect to each other.

A drive motor 38 is carried by walls 18 and 20 and has a drive shaft 40 provided with a spur gear 42 thereon in mesh with gear 28 of differential 22. Motor 38 is the primary drive means of apparatus 10 and can be reversible, if desired.

Figure 1:
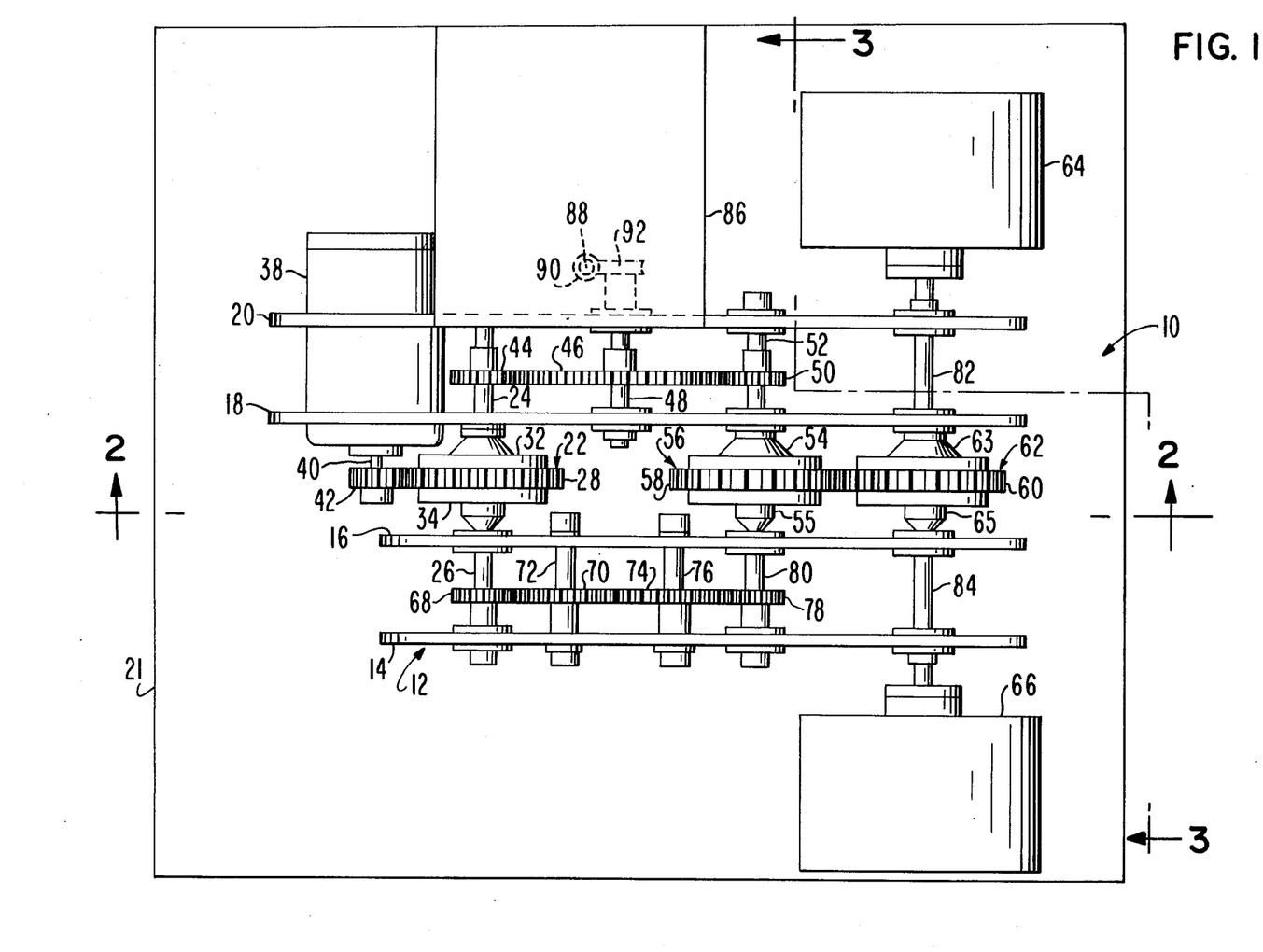
FIG. 1 is a top plan view of a first embodiment of the transmission apparatus of the present invention.

Shaft 24 has a relatively small spur gear 44 rigid thereto for rotation therewith. Spur gear 44 is in mesh with a larger spur gear 46 carried on a shaft 48 journaled in walls 18 and 20 as shown in FIG. 1. The gear ratio between gears 44 and 46 is typically a 1:4 ratio. Spur gear 46 is in mesh with a small spur gear 50 rigid to and rotatable with a shaft 52 journaled in walls 18 and 20 as shown in FIG. 1. The gear ratio between gears 50 and 46 is typically 1:4.

Figures 1A, 1B, 4, 5, 13:
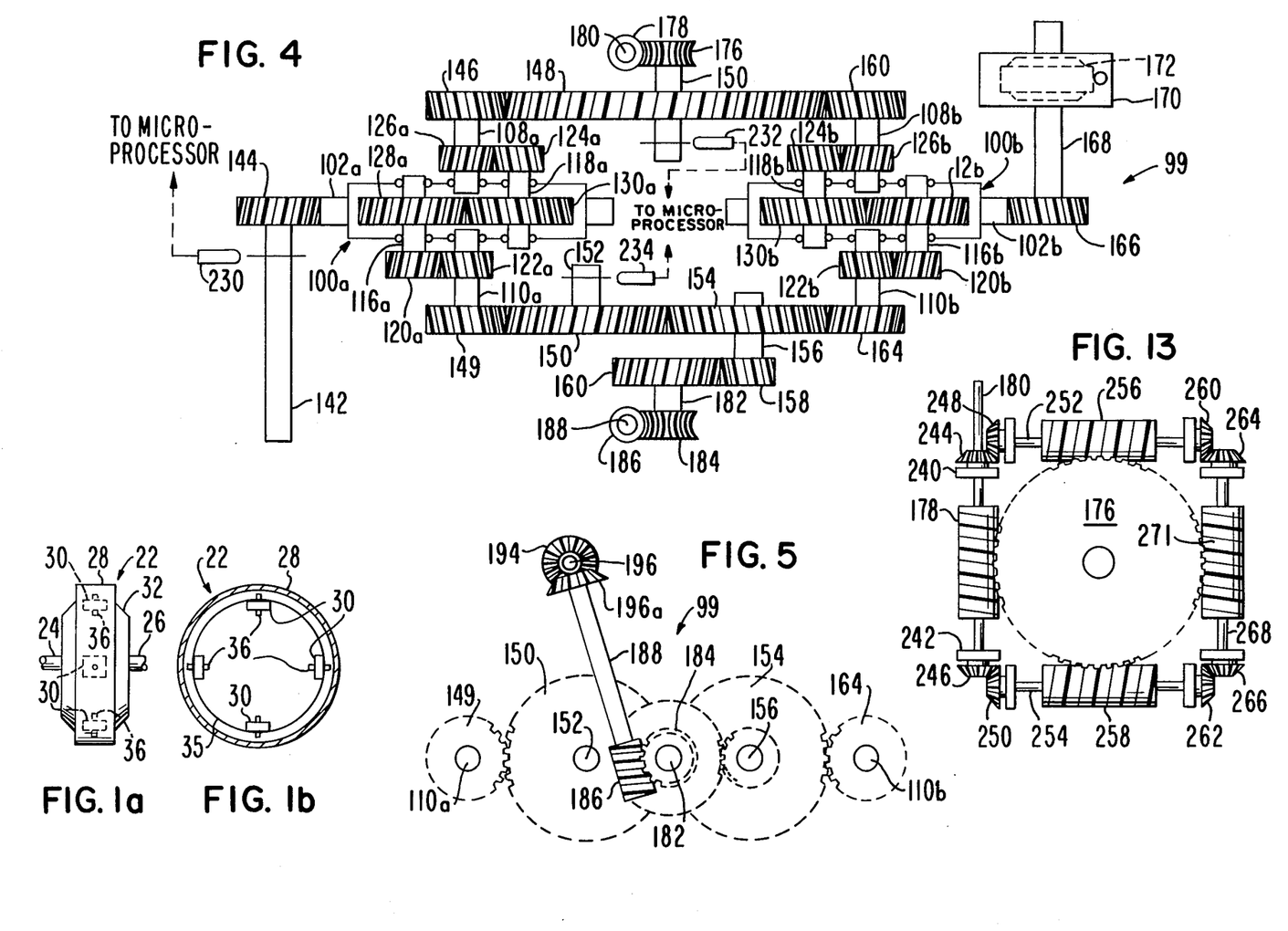
FIGS. 1a and 1b are end elevational and cross-sectional views of a conventional differential suitable for use with the embodiment of FIG. 1.
FIG. 4 is a view similar to FIG. 1 but showing another embodiment of the transmission apparatus of the present invention.
FIG. 5 is a fragmentary elevational view of one side of the embodiment of FIG. 4.
FIG. 13 is a top plan view of a control means showing an improved worm gear system for applying control forces to the embodiment of FIG. 4.

Shaft 52 is rigidly coupled to one member 54 of a second or output differential 56 which can be of the type shown in FIGS. 1a and 1b. Differential 56 has an outer ring gear 58 in mesh with the outer ring gear 60 of an adjacent differential 62 coupled as hereinafter described to a pair of rotatable elements 64 and 66 which, for purposes of illustration, can simulate the wheels of a vehicle with which transmission apparatus 10 could, for instance, be associated. Differential 62 can be of the same type as differentials 22 and 56. Differential 62 is provided for cornering of the rotatable elements 64 and 66 as is well known. If no cornering is to occur, differential 62 can be replaced by a spur gear rigidly connected to shafts 82 and 84 coupled with elements 64 and 66.

Returning to input differential 22, side member 34 thereof, being coupled to shaft 26, is also coupled to a relatively small spur gear 68 on shaft 26. Spur gear 68 is coupled to a spur gear 70 of intermediate size rigid to a shaft 72 journaled by bearings on walls 14 and 16. The gear ratio between gears 68 and 70 is typically 1:2. Spur gear 70 is in mesh with a second intermediate sized spur gear 74 rigid to a shaft 76 also journaled by bearings in walls 14 and 16 as shown in FIG. 1. Spur gear 74 is in mesh with a relatively small spur gear 78 rigid to a shaft 80 journaled by bearings in walls 14 and 16, shaft 80 being coupled to the opposite side member 55 of differential gear 56. A typical 1:2 gear ratio is provided between gears 78 and 74.

As can be seen in FIG. 1, there are four gears 68, 70, 74 and 78 on one side of differentials 22 and 56 and three gears 44, 46 and 50 on the opposite side. Thus, an even number of gears on one side and an odd number of gears on the opposite side will assure that the shafts 52 and 80 will rotate in opposite directions to achieve a neutral operating condition for the load, i.e., elements 64 and 66.

Differential 62 has its side members 63 and 65 coupled to respective shafts 82 and 84, shaft 82 being journaled by bearings in walls 18 and 20 and shaft 84 being journaled by bearings in walls 14 and 16. Rotatable elements 64 and 66 are rigidly secured to the outer ends of shafts 82 and 84, respectively.

A speed control motor 86 is carried by support 12 in any suitable location and has a drive shaft 88 (FIG. 3) provided with a worm 90 in mesh with a worm gear 92 on the outer end of shaft 48. The operation of motor 86 can control the speed of rotation of spur gear 46 and thereby control the speed of ring gear 58 of output differential 56 and, in turn, the speed of rotation of ring gear 60 of differential 62.

Figure 1C:
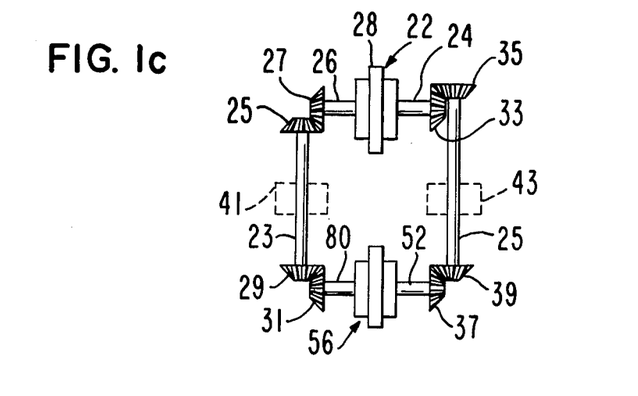
FIG. 1c is a schematic view of another embodiment of the apparatus.

An alternate apparatus for assuring reversal of shafts 52 and 80 of differential 56 is shown in FIG. 1c which illustrates a pair of parallel shafts 23 and 25 coupled by bevel gears to shafts 24, 26, 52 and 80. However the bevel gears are particularly arranged in FIG. 1c to allow for rotation of shaft 80 in the opposite direction from shaft 52 of differential 56 when shafts 24 and 26 rotate in the same direction.

Shaft 23 has meshed bevel gears 25 and 27 connecting shafts 23 and 26. Shafts 23 and 80 are coupled by meshed bevel gears 29 and 31. Shafts 24 and 25 are coupled by meshed bevel gears 33 and 35, and shafts 25 and 52 are coupled by meshed bevel gears 37 and 39. The way in which bevel gears 33 and 35 are coupled between shafts 24 and 25 permits shaft 25 to be rotated in the opposite sense to shaft 23 to thereby assure that shaft 80 will rotate in the opposite direction to shaft 52, assuming shafts 24 and 26 rotate in the same direction as the ring gear 28 of differential 22 is rotated. Speed control motors 41 and 43 can be coupled to shafts 23 and 25 for controlling the speeds thereof for the same reasons as that advanced above with respect to speed control motor 86.

Figure 1D:
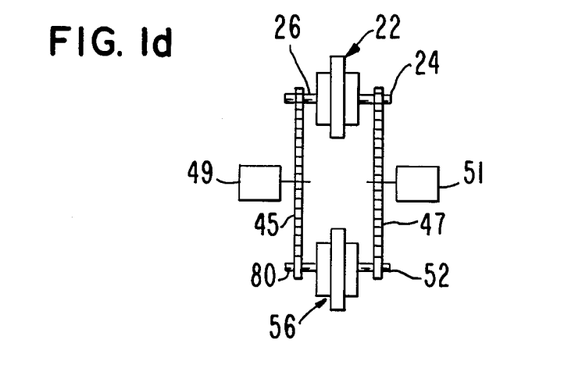
FIGS. 1d, 1e and 1f are schematic views of still another embodiment of the apparatus.
Figure 1E:
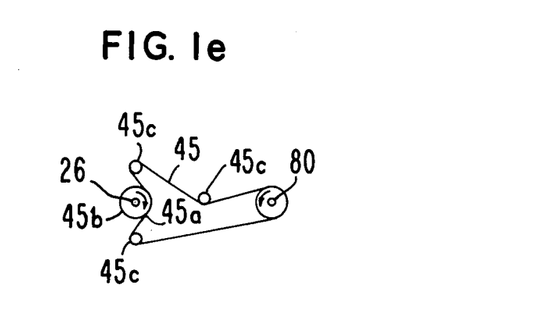
Figure 1F:
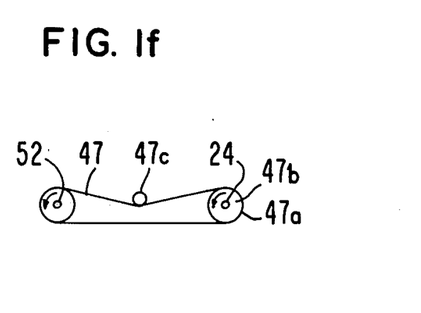
Figure 2:
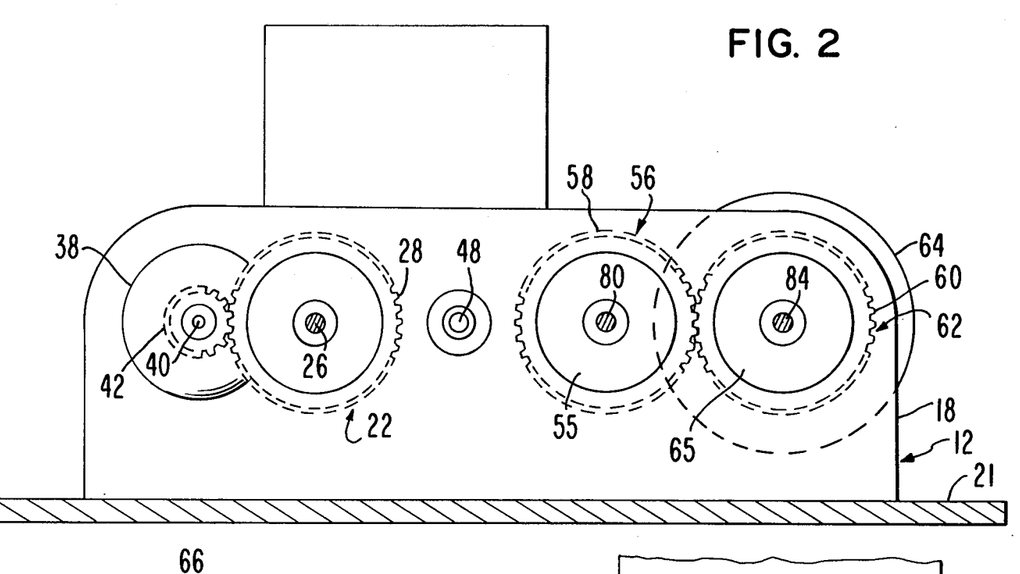
FIG. 2 is a cross-sectional view taken along line 2—2 of FIG. 1.
Figure 3:
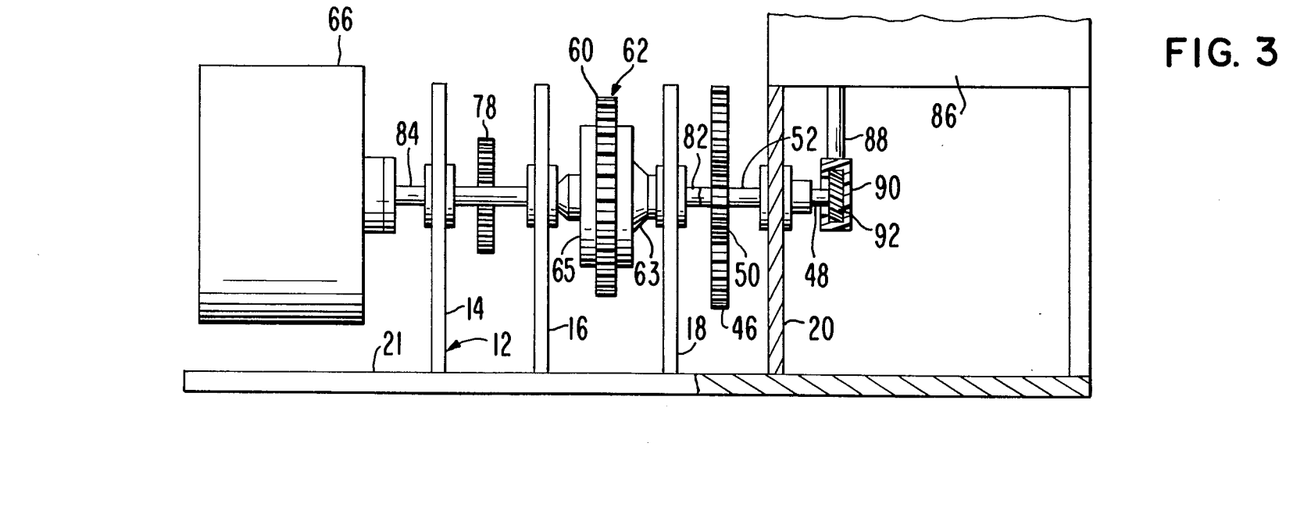
FIG. 3 is an end elevational view, partly in section, looking in the direction of line 3—3 of FIG. 1.

FIGS. 1d, 1e, and 1f show another apparatus which uses structure other than bevel gears as shown in FIG. 1c or spur gears as shown in FIG. 1 to assure rotation of shaft 80 in the opposite sense to shaft 52 of differential 56 as shafts 24 and 26 rotate in the same direction. To this end, shaft 26 is coupled by a chain or belt 45 to shaft 80 and shaft 24 is coupled by a chain or belt 47 to shaft 52. Chain or belt 45 has a stretch 45a which engages one side of a sprocket or pulley 45b coupled to shaft 26. Idlers 45c tension the chain or belt 45. In contrast, chain or belt 47 has a stretch 47a which is coupled on the opposite side of a sprocket or pulley 47b from that shown in FIG. 1e, with an idler 47c being also used to tension chain or belt 47. In this way, rotation of shafts 24 and 26 in the same direction will cause opposite rotation of shafts 52 and 80. Speed control devices 49 and 51 are coupled to central idlers 45c and 47c, respectively, for controlling the speeds of movement of the chains or belts 45 and 47.

In a typical operation of transmission apparatus 10, the various components are coupled together in the manner shown in FIG. 1. When drive motor 38 is energized to rotate spur gear 42 in a clockwise sense when viewing FIG. 2, ring gear 28 of differential 22 will be caused to rotate in a counterclockwise sense when viewing FIG. 2. If speed control motor 86 is not energized, then spur gear 46 cannot rotate because it will be locked against rotation by its connection through worm 90 and worm gear 92 to speed control motor 86. Thus, shaft 24 of side member 32 of differential gear 22 will not transmit motion to the spur gear 46 and thereby to member 54 of differential 56. In such a case, only side member 34 of differential 22 will rotate and it will rotate with and at twice the speed of ring gear 28 in a counterclockwise sense when viewing FIG. 2.

Rotation of side member 34 will cause rotation of shaft 26 in a counterclockwise sense which, in turn, will cause clockwise rotation of gear 70, counterclockwise rotation of gear 74 and clockwise rotation of gear 78. Such rotation of shaft 80 will be transmitted to side member 55 of differential 56, causing ring gear 58 of differential 56 to rotate differential gear 62 in a counterclockwise sense when viewing FIG. 2 at the same speed as that of ring gear 28 of differential 22. This will cause rotation of ring gear 60 and side members 63 and 65 of differential 62 in a counterclockwise sense which, in turn, will rotate shafts 82 and 84 and elements 64 and 66 in the same sense as that of ring gear 60. Thus, elements 64 and 66 will rotate in a "forward" direction at a 1:1 speed ratio with reference to the input speed of ring gear 28.

Elements 64 and 66 can rotate in a "reverse" direction at a 1:1 ratio by reversing the direction of rotation of drive shaft 40 of drive motor 38. Instead of rotating in a clockwise sense as described above as to "forward" rotation of elements 64 and 66, counterclockwise rotation of drive shaft 40 of motor 38 will cause clockwise rotation of the ring gear 28 of differential 22 when viewing FIG. 2, counterclockwise rotation of the ring gear 58 of differential 56, and clockwise rotation of the ring gear 60 of differential 62, all to the end that elements 64 and 66 will rotate together in a "reverse" direction.

For forward or reverse movement, the speed ratio of apparatus 10 can vary from neutral, i.e., zero speed to a 1:1 speed ratio by operation of the speed control motor 86. The effect of operating motor 86 is to allow rotation of gear 46 in a desired direction so as to control the speed of rotation of side member 54 of differential 56, side member 55 of differential 56 being controlled by the rotation of the ring gear of differential 22 through gears 68, 70, 74 and 78. As stated above, when shaft 52 is stationary, i.e., when speed control motor 86 is not actuated, ring gear 58 of differential 56 rotates at the same speed as ring gear 28 of differential 22, and apparatus 10 imparts a 1:1 speed ratio to elements 64 and 66. As motor 86 is actuated, and as spur gear 46 is allowed to rotate in a clockwise sense when viewing FIG. 2, the speed of rotation of shaft 52 can be progressively increased to cause rotation of spur gear 44 and thereby shaft 24 in a counterclockwise sense, the same sense as that of ring gear 28 and shaft 26. Thus, the rotation of ring gear 28 will not be affected by the operation of speed control motor 86. However, the speed of rotation of ring gear 58 will be affected because clockwise rotation of gear 46 will cause counterclockwise rotation of gear 50 and shaft 42, a sense which is opposite to that of gear 78 and shaft 80. Thus, ring gear 58 will progressively decrease in speed as speed control motor 86 is increasingly actuated. This can continue until the speeds of rotation of shafts 52 and 80 are equal and the shafts are rotating in opposite directions, at which time there will be no rotation imparted from ring 58 to ring gear 60 since ring gear 58 will not be rotating. Thus, a neutral condition will then exist.

While a single speed control motor 86 has been shown and described, a second speed control motor can be provided for any one of shafts 26, 72, 76 or 80. In such a case, the speed of the first speed control motor 86 will be increased so as not to restrict the rotation of gear 46, and the second speed control motor will control the rotation of side member 55 of differential 56.

Figure 8:
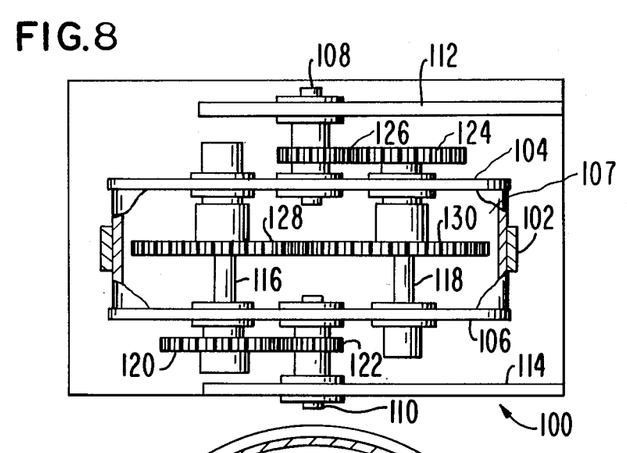
FIG. 8 is a top plan view of an improved differential suitable for use with the embodiment of FIG. 4.
Figure 9:
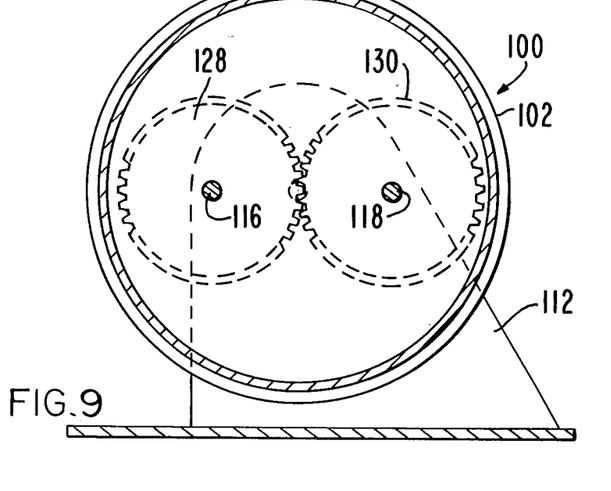
FIG. 9 is a side elevational view of the differential of FIG. 8.
Figure 10:
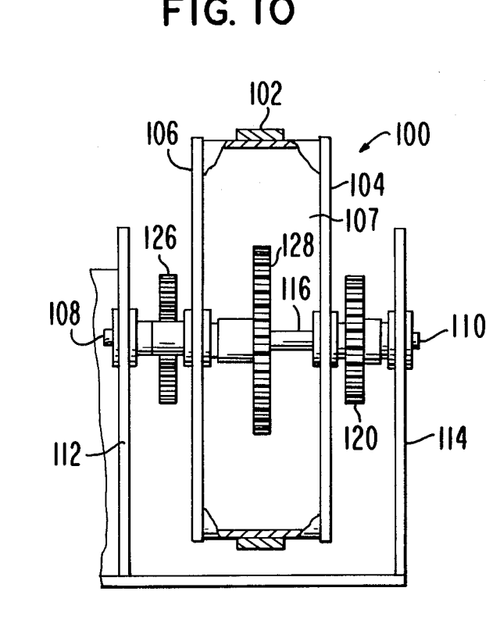
FIG. 10 is an end elevational view of the differential of FIGS. 8 and 9.

Another form of differential suitable for use as each of differentials 22, 56 and 62 is of the type shown in FIGS. 8–10 and is denoted by the numeral 99. It includes an outer ring gear 102 secured to a pair of spaced, parallel sides 104 and 106 defining a hollow space 107, there being a first shaft 108 journaled on side 104 and extending outwardly therefrom and a second shaft 110 journaled on side 106 and projecting outwardly therefrom, shafts 108 and 110 being generally coaxial with each other. Shaft 108 is mounted on a wall 112 and shaft 110 is mounted on a wall 114, walls 112 and 114 being for the same purpose as walls 16 and 18 as described above with respect to differential 22, for instance.

A pair of parallel shafts 116 and 118 are journaled for rotation in sides 104 and 106, and shafts 116 and 118 span the distance between sides 104 and 106. Shaft 116 has a spur gear 120 thereon exteriorly of space 107 and in mesh with a spur gear 122 on shaft 110. Similarly, shaft 118 has a spur gear 124 thereon exteriorly of space 107 and in mesh with a spur gear 126 on shaft 108. The gear ratio between gears 120 and 122 is typically 2:1, the same ratio typically being provided for gears 123 and 126. In addition, relatively large spur gears 128 and 130, typically at a 1:1 gear ratio, are mounted within space 107 on shafts 116 and 118, respectively, and gears 128 and 130 are in mesh with each other.

When shafts 108 and 110 rotate in opposite directions to each other and at the same speed, ring gear 102 remains stationary, i.e., neutral. If shaft 108 is stationary and shaft 110 is rotated, ring gear 102 will rotate in the same direction and at the same speed as shaft 110 because the ring gear and sides 104 and 106 will rotate as a unit (a 1:1 speed ratio) because gear 124 will rotate around gear 126 inasmuch as gear 126 is stationary. Similarly, variations in the speed between no rotation of the ring gear and maximum speed of rotation of the ring gear is achieved by rotating shafts 108 and 110 in the same or opposite directions at the same or at different speeds.

FIG. 4 illustrates a transmission apparatus broadly denoted by the numeral 140 using differentials 100 at input and output locations thereon. To this end, a power input shaft 142 adapted to be coupled to a drive motor (not shown) has a spur gear 144 in mesh with the ring gear 102a of a first differential 100a of the same type shown in FIGS. 8–10. The other elements of the differential are numbered in the same manner as the elements shown in FIGS. 8–10 except that each number is followed by the letter "a". Thus, shaft 108a is coupled to a spur gear 146, the latter being in mesh with a relatively large spur gear 148 on a shaft 150. Shaft 108a has spur gear 126a thereon in mesh with spur gear 124a carried by shaft 118a, the latter having a spur gear 130a thereon in mesh with spur gear 128a coupled with shaft 116a. Spur gear 120a on shaft 116a meshes with spur gear 122a on shaft 110a, shaft 110a having a spur gear 149 in mesh with spur gear 150 on shaft 152. Spur gear 150 is in mesh with a second spur gear 154 on shaft 156 having spur gear 158 thereon in mesh with a spur gear 160. Thus, on one side of differential 100, a relatively large spur gear 148 is provided; whereas, on the opposite side of the differential, a pair of spur gears 150 and 154 of intermediate size are provided. There is an odd number of gears (gears 146, 148 and 162) on one side of the transmission and an even number of gears (gears 149, 150, 154 and 164) on the opposite side of the transmission.

The second or output differential 100b in transmission apparatus 140 is coupled to a spur gear 162 in mesh with spur gear 148 and a spur gear 164 in mesh with spur gear 154. Spur gear 162 is mounted on a shaft 108b having spur gear 126b in mesh with a spur gear 124b on shaft 118b. Shaft 118b is coupled to a spur gear 130b in mesh with a spur gear 128b on a shaft 116b, the latter having a spur gear 120b in mesh with a spur gear 122b. Shaft 110b connects spur gear 122b with spur gear 164.

The outer ring gear 102b of differential 100a is coupled to spur gear 166 coupled to the output shaft 168 of a load 170, such as the wheels of a vehicle. Load 170 may be provided with a standard planetary reversing gear broadly denoted by the numeral 172.

Figure 7:
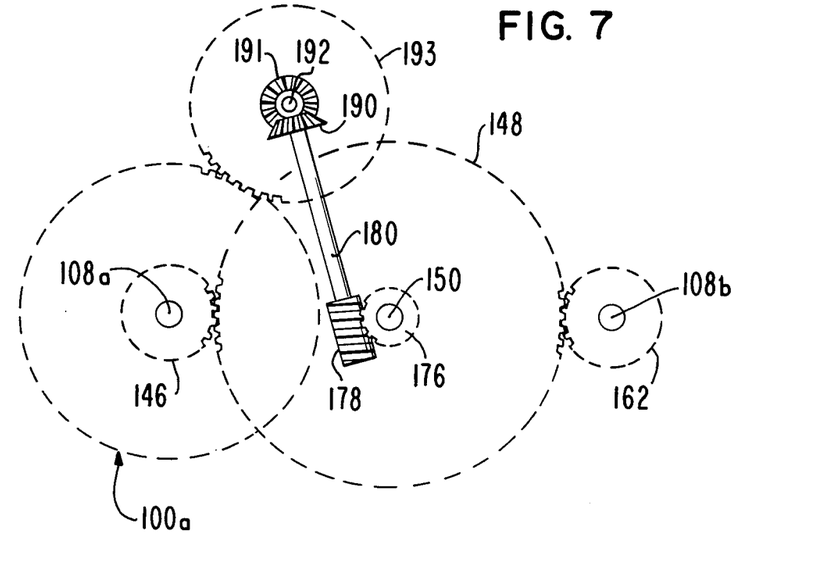
FIG. 7 is a view similar to FIG. 5 but showing the opposite side of the embodiment of FIG. 4.

Means is provided for controlling the speed of rotation of spur gear 148 (FIG. 4) in the form of a worm gear 176 coupled to a worm 178 on a shaft 180 (FIGS. 4 and 7).

Similarly, means for controlling the speed of rotation of spur gear 154 includes a shaft 182 coupled to a worm gear 184 in mesh with a worm 186 on a shaft 188. Shaft 180 and shaft 188 are coupled to a differential 189 in the manner shown in FIG. 11. Differential 189 can be and, for purposes of illustration is, of the type shown in FIGS. 8–10.

Figure 11:
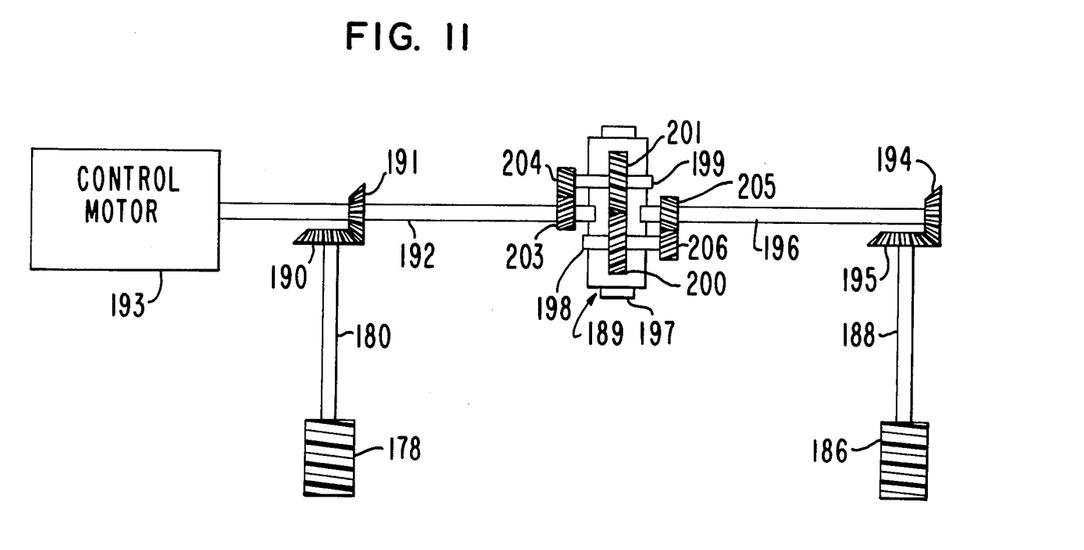
FIG. 11 is a side elevational view of a speed control means for the embodiment of FIG. 4.

A pair of bevel gears 190 and 191 couple a shaft 192 to shaft 180, shaft 192 being the drive shaft of a speed control motor 193. A pair of bevel gears 194 and 195 interconnect shaft 188 and a shaft 196, the latter being coaxial with shaft 92.

Differential 189 has a ring gear 197 (FIG. 6) in mesh with the ring gear 102a of differential 100a (FIG. 4). Moreover, differential 189 has a pair of rotatable shafts 198 and 199 provided with spur gears 200 and 201 thereon, spur gears 200 and 201 being in mesh with each other with the space surrounded by ring gear 197. Shaft 192 has a spur gear 203 thereon in mesh with a spur gear 204 on shaft 199. Similarly, shaft 196 has a spur gear 205 in mesh with a spur gear 206 on shaft 198.

Figure 6:
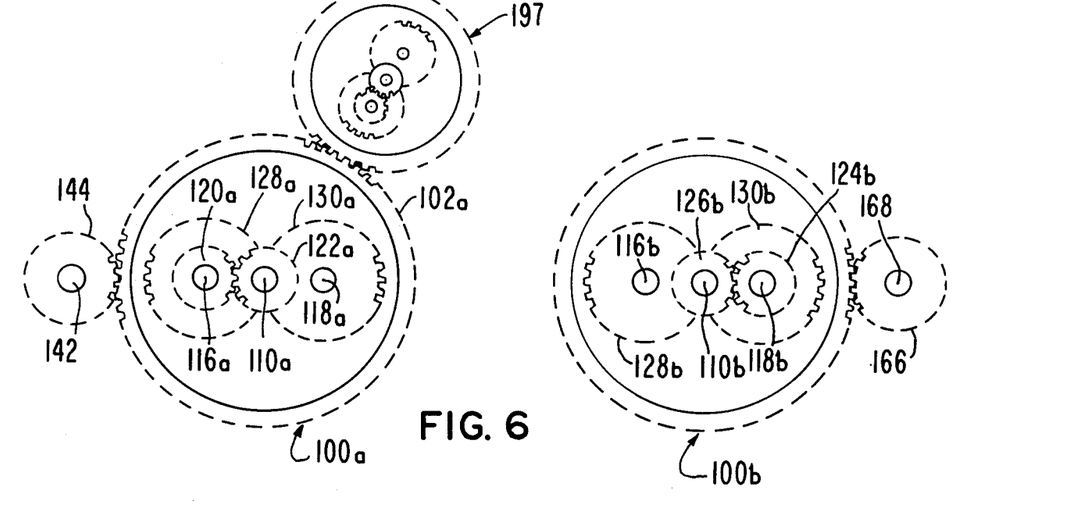
FIG. 6 is a fragmentary side elevational view of an interior part of the embodiment of FIG. 4.

Ring gear 197 (FIG. 11) on differential 189 is in mesh as shown in FIG. 6 with ring gear 102a of differential 100a. Thus, when differential 100a is driven by the drive motor coupled with shaft 142 (FIG. 4), control motor 193 can control worms 178 and 186 (FIG. 11) and thereby, at different times, control the speeds of rotation of shafts 108b and 110b, respectively, of differential 100b. In this way, the speed ratio of apparatus 99 can be varied from 0 (neutral) to 1:1 in a forward direction or to 1:1 in a reverse direction.

Figure 12:
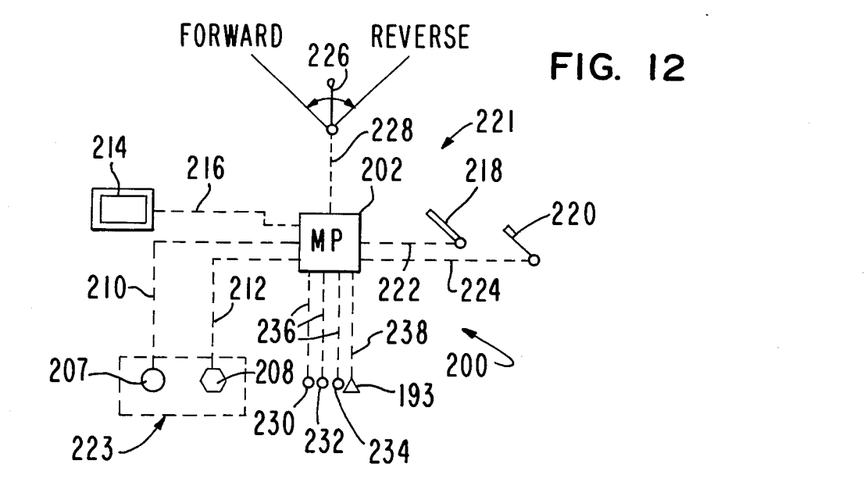
FIG. 12 is a schematic diagram of control circuitry for the embodiment of FIG. 4 when the embodiment is used on a vehicle.

FIG. 12 shows in schematic form a control means for a load, such as a vehicle, using the transmission apparatus 10 or the transmission apparatus 99. The control means, broadly denoted by the numeral 221, includes a microprocessor 202 having a number of components coupled therewith including a drive motor 223, such as an internal combustion engine or turbine, provided with a vacuum sender 207, if drive motor 223 is an engine, and a governor servo 208, for the carburetor of the engine, sender 207 being coupled by a line 210 to microprocessor 202 and governor 208 being coupled by a line 212 to the microprocessor. An operator information readout 214 is coupled by a line 216 to the microprocessor. A throttle sender 218 and a brake pedal sender 220 are coupled by lines 222 and 224 to the microprocessor. A forward-neutral-reverse lever 226 is coupled by a line 228 to the microprocessor. Shaft counters 230, 232 and 234 are coupled by lines 236 to the microprocessor and a control motor, such as control motor 193, is coupled by a line 238 to the microprocessor. If the transmission 99 of FIGS. 4–7 is used, shaft counters 230, 232 and 234 are as shown in FIG. 4. Thus, the speeds of rotation of shafts 142, 150 and 152 will be detected and such information will be sent to the microprocessor along lines 236 for continuous updating of ratio information.

In operation of a vehicle using the control means of FIG. 12 and transmission 99 in FIGS. 4–7, the drive motor 223 coupled with input power shaft 142 will be energized to rotate shaft 142, for instance, in a forward direction. This will cause gear 144 to rotate ring gear 102a which will impart rotation to shafts 108a and 110a depending upon the state of operation of speed control motor 193. If speed control motor 193 is not operating, there will be no rotation of shaft 192 (FIG. 11), and ring gear 197 of differential 189, because it is in mesh with ring gear 102a of differential 100a as shown in FIG. 6, will be rotating solely under the influence of ring gear 102a. This will cause shaft 110a to rotate spur gear 149, spur gear 150, spur gear 154 and spur gear 164 such that ring gear 102b of differential 100b will rotate at the same speed and in the same direction as ring gear 102a of differential 100a, causing spur gear 166 and thereby output power shaft 168 to rotate in the opposite direction or the direction of rotation of input power shaft 142, thereby driving load 170. If the drive motor coupled to shaft 142 is not a reversible drive motor, the reversing planetary gear unit 172 coupled with load 170 can be used to reverse the direction of rotation of shaft 168, if desired. If the drive motor coupled with shaft 142 is reversible, then planetary gear unit 172 is not needed.

In the event that control motor 193 (FIG. 11) is actuated, it will control the rotation of worms 178 and 186 and thereby control the ratio of torque applied between shafts 142 and 168. Thus, with a proper operation of speed control motor 193, through the operation of lever 226 (FIG. 12) and microprocessor 202, it is possible to vary the speed ratio from 1:1 in the forward direction, through neutral (zero speed) to reverse at a 1:1 speed ratio. The signal applied to the microprocessor 202 by lever 226 will control the degree of actuation of speed control motor 193 (FIG. 11) and thereby provide the necessary drive action either in the forward direction or the reverse direction.

In FIG. 11, the gear loading for the worm gears 176 and 184 (FIG. 4) can be reduced by the use of the worm structure of FIG. 13 in which, for purposes of illustration, shaft 180 coupled with worm 178 is coupled with thrust bearings 240 and 242 as well as with bevel gears 244 and 246. These last-mentioned bevel gears are coupled with bevel gears 248 and 250 of shafts 252 and 254, respectively, these latter shafts having worms 256 and 258 in mesh with respective sides of worm gear 176 and to bevel gears 260 and 262. Gears 260 and 262 are in mesh with bevel gears 264 and 266 on the ends of shaft 268 having a worm 271 in mesh with worm gear 176. Thus, by rotation of shaft 180, the torque applied to worm gear 176 is uniformly distributed thereon at four locations, namely the locations where worms 178, 256, 258 and 271 engage worm gear 176. Worm gear 184 can be provided with the same type of drive structure as shown in FIG. 13.

Figure 14:
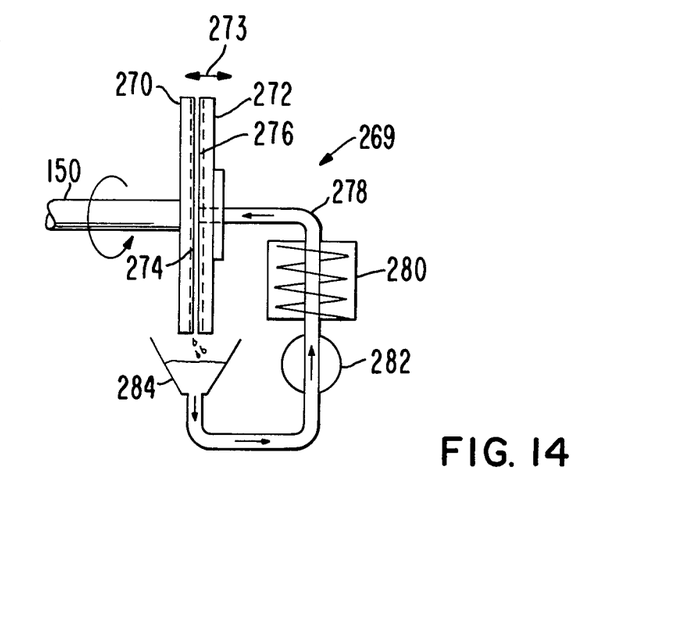
FIGS. 14 and 15 are schematic views of first and second conventional speed control means usable with the transmission apparatus of the present invention.

Another speed control means can be of the type shown in FIG. 14 and denoted by the numeral 269. Means 269 includes a pair of adjacent disks 270 and 272 in face-to-face relationship, disk 270 being coupled, for instance, to shaft 150 of the apparatus 99 of FIG. 4, and disk 272 being non-rotatable but shiftable axially in the direction of arrows 273 by some suitable means (not shown). The adjacent faces of disks 270 and 272 have radial grooves 274 and 276 into which are fed a liquid from a line 278 coupled to a fluid cooling device 280. A pump 282 is coupled at its inlet to a reservoir 284 located below the disks to receive oil or other liquid gravitating from the grooves in the disks.

The means of FIG. 14 operates on the principle that, when pump 282 forces a liquid, such as oil, into the grooves of the disks, the rotation of the shaft 150 and thereby disk 270 causes a shearing action on the liquid which impedes to a greater or lesser extent the rotation of disk 270 and thereby controls the speed of shaft 150 as a function of the axial position of disk 272 with reference to disk 270. For the disks to be close together, there will be a minimum of impedance or a maximum amount of speed control of the rotation of shaft 150. When the disks are relatively far apart, the minimum amount of speed control is achieved and disk 150 is either stationary or very slowly rotating. Power to pump 282 can be taken off the power source coupled to shaft 142 (FIG. 4) of apparatus 99. A device of this type is one made by Twin Disk Corporation of Wisconsin.

Figure 15:
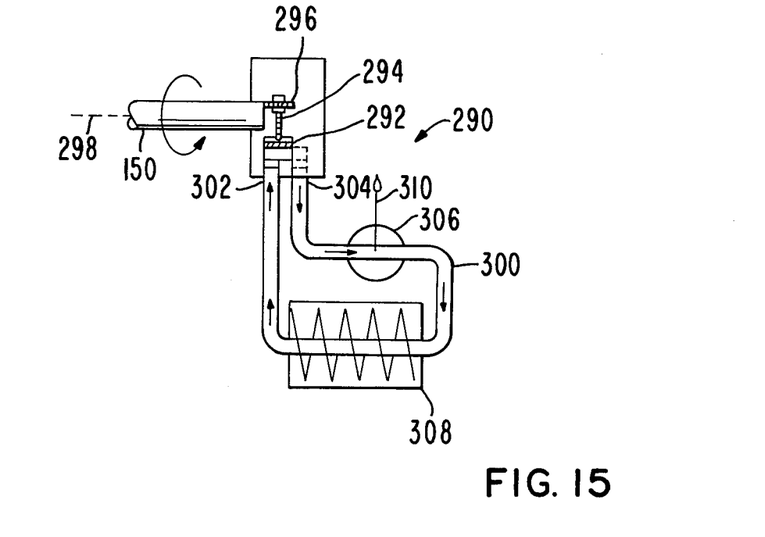

Still another speed control means is of the type shown in FIG. 15 and denoted by the numeral 290. Means 290 includes a positive displacement piston 292 coupled by a link 294 to shaft 150, for instance, at a location 296 on the latter offset from the axis 298 of rotation of the shaft. A liquid-containing line 300 is coupled at a pair of ends 302 and 304 to the cylinder containing the positive displacement piston 292, a valve 306 is coupled in line 300 as is a fluid cooling device 308. A lever 310 is used to manually or automatically open and close the valve 306.

The means of FIG. 15 operates on the principle that, with valve 306 closed, piston 292 cannot move because it cannot pump the liquid in line 300. Thus, shaft 150 is stationary. By opening valve 306, there will be less tendency to inhibit the reciprocal movement of piston 292 in its cylinder; thus, this will allow shaft 150 to rotate to a certain extent. With valve 306 fully opened, shaft 150 will be able to rotate with minimum speed control as determined by its connection to the remainder of the system of apparatus 99 (FIG. 4). In this way, the control of the speed of shaft 150 is achieved without the expenditure of any work in driving the liquid in line 300.

I claim:
1. Transmission apparatus comprising:
a first differential having first and second coaxial shafts rotatable independently of each other, said first differential having a first drive member and means rotatably coupling the first drive member to said first and second shafts, said first drive member adapted to be coupled to a source of power for rotating the first drive member;
a second differential spaced from the first differential and having third and fourth coaxial shafts rotatable independently of each other, the second differential having a second drive member and means rotatably coupling the second drive member on the third and fourth shafts, said second drive adapted to be coupled to a rotatable load for rotating the load;
first means coupling the first shaft with the third shaft to cause rotation of the third shaft in response to the rotation of the first shaft;
second means coupling the second shaft with the fourth shaft to cause rotation of the fourth shaft in response to the rotation of the second shaft, said first means and said second means being operable to permit rotation of the third and fourth shafts in opposite directions as said first and second shafts, said speed changing means including a power source having a rotatable power shaft, first worm gear means coupling the power shaft to the second shaft, second worm gear means coupled with the first shaft, and differential means coupling the power shaft of the power device with the second worm gear means, said differential means being coupled to the first drive member, whereby the first drive member will rotate the second worm means when the power source is de-energized and will control the speed of rotation of the second worm means as the power device is energized.

2. Apparatus as set forth in claim 1, wherein said differential means includes seventh and eight coaxial shafts and a third drive member rotatably mounted on the seventh and eighth shafts.

* * * * *